(12) United States Patent
Yamaguchi et al.

(10) Patent No.: US 7,583,041 B2
(45) Date of Patent: Sep. 1, 2009

(54) OVERHEAT PREVENTING APPARATUS FOR ELECTRIC MOTOR

(75) Inventors: Noritaka Yamaguchi, Wako (JP); Yutaka Tamagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 315 days.

(21) Appl. No.: 11/246,383

(22) Filed: Oct. 7, 2005

(65) Prior Publication Data
US 2006/0076840 A1 Apr. 13, 2006

(30) Foreign Application Priority Data
Oct. 13, 2004 (JP) ............................. 2004-299424

(51) Int. Cl.
*G05D 23/00* (2006.01)
(52) U.S. Cl. .................. 318/471; 318/634; 318/641; 318/783; 318/788; 318/792; 310/53; 310/54
(58) Field of Classification Search .............. 310/53, 310/54, 315, 341, 346, 16; 701/22; 180/65.1, 180/65.2, 339, 79.52; 318/807, 54, 634, 318/641, 788, 783, 471, 117, 700, 689, 727, 318/792, 244, 255, 432; 188/65.2, 276; 123/41.12, 123/339.24, 686; 165/58
See application file for complete search history.

(56) References Cited
U.S. PATENT DOCUMENTS

| | | | | |
|---|---|---|---|---|
| 5,160,878 A | * | 11/1992 | Nagano | 318/800 |
| 5,446,362 A | * | 8/1995 | Vanek et al. | 318/801 |
| 5,755,378 A | * | 5/1998 | Dage et al. | 236/91 C |
| 6,042,265 A | * | 3/2000 | Kliman et al. | 374/152 |
| 6,178,928 B1 | * | 1/2001 | Corriveau | 123/41.12 |
| 6,291,958 B1 | * | 9/2001 | Amey et al. | 318/471 |
| 6,459,222 B1 | * | 10/2002 | Chen | 318/430 |
| 6,465,978 B2 | * | 10/2002 | Takahashi | 318/432 |
| 6,636,788 B2 | * | 10/2003 | Tamagawa et al. | 701/22 |
| 6,847,187 B2 | * | 1/2005 | Kumar | 318/783 |

(Continued)

FOREIGN PATENT DOCUMENTS

JP 62-058851 3/1987

(Continued)

OTHER PUBLICATIONS

Japanese-language Office action from priority Japanese application No. JP 2004-299424, dated Mar. 24, 2009.

*Primary Examiner*—Bentsu Ro
*Assistant Examiner*—Antony M Paul
(74) *Attorney, Agent, or Firm*—Fish & Richardson P.C.

(57) ABSTRACT

The present invention includes temperature transition estimating means 24, 25 for estimating a temperature transition of an electric motor 1 caused by the passage of electric current through the electric motor 1, an electric pump 8 as coolant supplying means for supplying a coolant to the electric motor, and coolant supply control means 26 to 28 for controlling the pump 8 according to the temperature transition of the electric motor 1 and the coolant temperature. The amount of operation of the electric pump 8 is determined from the temperature transition and the coolant temperature. This structure makes it possible to prevent overheating of the electric motor properly using the coolant while minimizing the energy consumption involved in using the coolant.

11 Claims, 13 Drawing Sheets

U.S. PATENT DOCUMENTS

| | | | |
|---|---|---|---|
| 7,199,549 B2 * | 4/2007 | Kleinau et al. | 318/798 |
| 7,242,166 B2 * | 7/2007 | Swahn et al. | 322/28 |
| 2002/0006154 A1 * | 1/2002 | Nada | 374/169 |
| 2002/0147530 A1 * | 10/2002 | Tamagawa et al. | 701/22 |
| 2006/0038539 A1 * | 2/2006 | Swahn et al. | 322/24 |

FOREIGN PATENT DOCUMENTS

| | | |
|---|---|---|
| JP | 11-027806 | 1/1999 |
| JP | 2000-032602 | 1/2000 |
| JP | 2002-227644 | 8/2002 |
| JP | 2002-369578 | 12/2002 |

* cited by examiner

FIG.6

| RULE NO. | ANTECEDENT | | CONSEQUENT | |
|---|---|---|---|---|
| | P_TRQ | P_ATRQ | TEMP. VARIATION | (TEMP. CHANGE VALUE) |
| 1 | SMALL | SMALL | DROP | Y=A1 |
| 2 | SMALL | LARGE | SMALL INCREASE | Y=A2 |
| 3 | MEDIUM | SMALL | SMALL INCREASE | Y=A3 |
| 4 | MEDIUM | LARGE | MEDIUM INCREASE | Y=A4 |
| 5 | LARGE | SMALL | MEDIUM INCREASE | Y=A5 |
| 6 | LARGE | LARGE | LARGE INCREASE | Y=A6 |

FIG.9

| RULE NO. | ANTECEDENT | | CONSEQUENT | |
|---|---|---|---|---|
| | $\Delta Tf$ | Tc | COOLANT FLOW ADJUSTING VALUE | (VALUE FOR AMOUNT OF OPERATION) |
| 7 | SMALL | LOW | DECREASE | Y=A7 |
| 8 | LARGE | LOW | SMALL INCREASE | Y=A8 |
| 9 | SMALL | HIGH | MEDIUM INCREASE | Y=A9 |
| 10 | LARGE | HIGH | LARGE INCREASE | Y=A10 |

OVERHEAT PREVENTING APPARATUS FOR ELECTRIC MOTOR

BACKGROUND OF THE INVENTION

1. Technical Field of the Invention

The present invention relates to an overheat preventing apparatus for preventing an electric motor from overheating, and particularly to an overheat preventing apparatus suitable for an electric motor mounted on an electric or hybrid vehicle.

2. Description of the Related Art

For preventing overheating of an electric motor mounted on a vehicle such as an electric or hybrid vehicle for generating a driving force of the vehicle or converting kinetic energy of the vehicle into electric energy to charge an electrical storage device, there is known a technique, for example, as disclosed in Japanese patent laid-open applications No. 11-27806 (Patent Document 1) and 2000-32602 (Patent Document 2), which detects the temperature of the electric motor using a temperature sensor to forcibly limit the output power of the electric motor according to the detected temperature. Further, the present applicant has proposed another technique, as disclosed in Japanese patent laid-open application No. 2002-369578, or equivalent U.S. Pat. No. 6,636,788 (Patent Document 3), for estimating temperature changes of an electric motor without using a temperature sensor to limit the output power of the electric motor according to the estimate.

According to Patent Document 1, a future temperature reaching point is estimated based on a history of detected temperature values so that the output power of the electric motor will be limited not to allow the estimated temperature to exceed a predetermined value, and hence to prevent overheating of the electric motor. According to Patent Document 2, the temperature at which the limiting of output power of the electric motor starts is set lower in a regenerative mode (when the electric motor regenerates electric power) than in a power mode (when the electric motor generates a driving force of the vehicle) to reduce the heat generation of the electric motor. According to Patent Document 3, when an estimated temperature change (temperature rise) exceeds a predetermined value, the output power of the electric motor is limited to prevent overheating of the electric motor.

As mentioned above, the structures disclosed in Patent Documents 1 to 3 are all to limit the output power of the electric motor as appropriate to reduce the heat generation of the electric motor, and hence to prevent overheating of the electric motor. However, when the vehicle is going up a hill or carries a heavy load, the aforementioned structures may make it difficult to produce torque enough to deliver performance required for the vehicle. Such a problem is likely to arise especially with electric vehicles having only the electric motor as their power source.

It is therefore desirable to avoid limiting the output power of the electric motor as much as possible. An alternative structure can be considered, which supplies a coolant to the electric motor to actively cool the electric motor. In this case, however, if the coolant is supplied improperly, the amount of energy consumed by a mechanism such as a pump for supplying the coolant may become unnecessarily too large to provide energy savings.

SUMMARY OF THE INVENTION

In view of the above technical background, it is an object of the present invention to provide an overheat preventing apparatus that can prevent overheating of an electric motor properly using a coolant while minimizing the energy consumption involved in using the coolant.

In order to attain the above object, the present invention provides an overheat preventing apparatus for preventing an electric motor from overheating. The apparatus comprises temperature transition estimating means for estimating a temperature transition of the electric motor caused by the passage of electric current through the electric motor, coolant supplying means for supplying a coolant to the electric motor, and coolant supply control means for controlling the amount of coolant supply from the coolant supplying means according to at least the estimated temperature transition of the electric motor.

According to the present invention, the temperature transition of the electric motor estimated by the temperature transition estimating means is a temperature transition of the electric motor resulting from the passage of electric current through the electric motor, that is, caused by Joule heat generated when the electric current flows through the armature of the electric motor. The temperature transition does not have to be a transition of temperature values themselves (in time sequence); it may be a relative temperature transition in relation to any reference temperature. According to the present invention, the amount of coolant supply from the coolant supplying means is controlled according to the temperature transition. This structure makes it possible to inhibit excessive temperature rise (overheating) of the electric motor by supplying an appropriate amount of coolant (neither too much nor too little) consistent with the amount of heat generated by the passage of electric current through the electric motor. Thus, the present invention can prevent overheating of the electric motor using the coolant while minimizing the energy consumption involved in using the coolant.

Such a structure of the present invention preferably further comprise coolant temperature sensing means for sensing the temperature of the coolant to be supplied to the electric motor so that the coolant supply control means will control the amount of coolant supply from the coolant supplying means according to the sensed coolant temperature and the estimated temperature transition of the electric motor.

According to this structure of the present invention, since the amount of coolant supply can be controlled with consideration given not only to the temperature transition resulting from the passage of electric current through the electric motor, but also to the coolant temperature (and hence to the degree of heat absorption of the coolant from the electric motor), an amount of coolant more consistent with the amount of heat generated by the passage of electric current through the electric motor can be supplied to the electric motor. This makes it possible to keep the energy consumption necessary for the supply of the coolant to a minimum.

In the structure including the coolant temperature sensing means according to the present invention, the coolant supply control means preferably uses the estimated temperature transition of the electric motor and the sensed coolant temperature as input parameters to determine, by fuzzy inference, an amount of operation of the coolant supplying means from the input parameters, operate the coolant supplying means according to the determined amount of operation, and control the amount of coolant supply to the electric motor.

According to this structure of the present invention, since the amount of operation of the coolant supplying means (for example, an adjusting value to control an increasing or decreasing amount of coolant supply) is determined by fuzzy inference to operate the coolant supplying means according to the determined amount of operation, the number of preset parameter values used to determine the amount of operation of the coolant supplying means can be reduced. This makes it possible to control the coolant supplying means with a small memory usage without using a map or the like requiring a relatively large memory capacity. Fuzzy inference is relatively flexible to define and set necessary membership functions and the like, and this makes it easy to configure an algorithm used for determining the amount of operation.

When the amount of operation of the coolant supplying means is determined by fuzzy inference, the coolant supply control means preferably includes: means for calculating goodness-of-fit values (grade values) for fuzzy rules based on membership functions, for example, from the membership functions for classifying and expressing the respective orders of magnitude of the input parameters, a plurality of fuzzy rules having the respective orders of magnitude of the input parameters in the antecedent part and a plurality of preset values for the amount of operation of the coolant supplying means in the consequent part, and the input parameters; and means for calculating a weighted average value of the plurality of set values in the consequent part of the fuzzy rules using the calculated goodness-of-fit values as weighting factors in the consequent part of the fuzzy rules to determine the calculated average value as the amount of operation.

According to this structure of the present invention, the consequents in the fuzzy rules are preset values for the amount of operation of the coolant supplying means, and this makes it easy to calculate the amount of operation compared to a case where membership functions are provided for the consequents in the fuzzy rules.

Among the input parameters (the temperature transition of the electric motor and the coolant temperature), the order of magnitude of the temperature transition is equal to the order of magnitude of an instantaneous value in the temperature transition (e.g., an instantaneous value of temperature relative to a reference temperature).

When the amount of operation of the coolant supplying means determined by fuzzy inference defines a corrective amount for the amount of coolant supply from the coolant supplying means, the coolant supplying means preferably includes means for integrating a series of determined values for the amount of operation to determine the integral as a value to define the amount of coolant supply from the coolant supplying means, and means for controlling the amount of coolant supply according to the calculated integral. This structure can prevent the amount of coolant supply from changing excessively.

Heat generated by the passage of electric current through the electric motor increases as the torque (produced torque) of the electric motor increases (and hence to make electric current passing through the electric motor larger). Further, the rated torque of the electric motor means torque that allows the electric motor to operate continuously without causing problems such as overheating of the electric motor. Therefore, in order to prevent overheating of the electric motor properly, the temperature transition of the electric motor producing torque higher than the rated torque becomes important. Further, when the torque of the electric motor is maintained constant, the temperature of the electric motor converges to a substantially steady-state temperature.

Therefore, in this structure of the present invention, the temperature transition of the electric motor estimated by the temperature transition estimating means is preferably a temperature transition of the electric motor in a region of temperature equal to or above a temperature of the electric motor in a steady-state in which the torque of the electric motor is maintained in a predetermined torque range. According to this structure, the temperature transition of the electric motor necessary to prevent overheating of the electric motor can be estimated properly. Further, the temperature region for estimating the temperature transition can be determined, and this makes it easy to configure the estimation algorithm.

When the electric motor is controlled according to command values for torque to be produced by the electric motor, the transition of the electric motor shows a strong correlation between the torque command values (instantaneous values) and an average value of the torque command values. Therefore, in the structure of the present invention, when the operation of the electric motor is controlled according to the command values for torque to be produced by the electric motor, the temperature transition estimating means is preferably means for estimating the temperature transition of the electric motor based on the torque command values and the average value of the torque command values. According to this structure, the temperature transition of the electric motor can be estimated properly.

To be more specific, a temperature change (an instantaneous temperature change) of the electric motor in a sufficiently short time, especially a change in temperature rise when the electric motor is operating with relatively high output torque (e.g., output torque that exceeds the rated torque of the electric motor) can be estimated correctly with a relatively high degree of precision through fuzzy inference operations using the torque command values and the average value of the torque command values as input parameters. In other words, since the electric current flowing through the armature of the electric motor is basically proportional to the torque command value, the torque command value is closely related to the amount of heat (Joule heat) generated by the passage of electric current through the electric motor. The average value of the torque command values is closely related to a tendency of temperature changes (e.g., an increasing tendency or decreasing tendency of the temperature of the electric motor) resulting from the passage of electric current through electric motor. Therefore, if the fuzzy inference algorithm (specifically the membership functions and fuzzy rules) is configured in an appropriate fashion, the temperature change resulting from the passage of electric current through electric motor can be estimated through fuzzy inference operations using these torque command values and the average value of them.

Therefore, in the structure of the present invention, the temperature transition estimating means preferably includes temperature change estimating means for estimating temperature changes of the electric motor per predetermined unit time by fuzzy inference from the torque command values and the average value of the torque command values as input parameters, and integration means for calculating an integral of the estimated temperature changes as an estimate of the temperature transition of the electric motor.

According to this structure, since the temperature changes of the electric motor per predetermined unit time can be estimated properly by fuzzy inference from the torque command values and the average value of the torque command values, the temperature transition resulting from the passage of electric current through the electric motor can be estimated properly by the integration means sequentially integrating the estimated values of the temperature changes without using a sensor such as a temperature sensor. Further, since the temperature changes per unit time are estimated properly by fuzzy inference, the number of preset parameter values can be reduced. This makes it possible to perform an estimation of the temperature transition using a simple algorithm and hence with a small memory usage without using a map or the like requiring a relatively large memory capacity. Especially when the amount of operation of the coolant supplying means is determined by fuzzy inference in the manner mentioned above, the memory usage, for the electric motor, of the overheat preventing apparatus of the present invention can be effectively reduced.

When the temperature changes (resulting from the passage of electric current through the electric motor) per unit time are estimated by fuzzy inference, the temperature transition estimating means preferably includes: means for calculating goodness-of-fit values (grade values) for fuzzy rules based on membership functions, for example, from the membership functions for classifying and expressing the respective orders of magnitude of the input parameters, a plurality of fuzzy rules having the respective orders of magnitude of the input parameters in the antecedent part and a plurality of preset values for the temperature changes per unit time in the consequent part, and the input parameters; and means for calculating a weighted average value of the plurality of set values in the consequent part of the fuzzy rules using the calculated goodness-of-fit values as weighting factors in the consequent part of the fuzzy rules to determine the calculated average value as an estimate of the temperature changes per unit time.

According to this structure, the consequents in the fuzzy rules are preset values for the temperature changes per unit time, and this makes it easy to calculate the temperature change, as described above related to the coolant supply control means, compared to a case where membership functions are provided for the consequents in the fuzzy rules.

In order to prevent overheating of the electric motor, the temperature transition of the electric motor producing torque higher than the rated torque becomes important. If the torque command value is equal to or smaller than a predetermined value (e.g., a value equal to or near the rated torque value), the membership functions and the fuzzy rules for fuzzy inference are preferably established such that the temperature changes per unit time estimated by fuzzy inference will be nearly equal to 0. This makes it possible to improve the precision of estimation of the temperature changes per unit time, and hence the temperature transition of the electric motor, in the case where the output torque of the electric motor is relatively high.

For control of an electric motor such as DC brushless motor, so-called d-q vector control is commonly known. According to the d-q vector control, d-q coordinate axes are assumed in the direction of the magnetic flux of the magnetic field of the electric motor and a direction orthogonal to the direction of the magnetic flux to represent an armature circuit of the electric motor as an equivalent circuit consisting of a virtual armature in the d-axis direction and a virtual armature in the q-axis direction. An armature current component id in the d-axis direction and an armature current component iq in the q-axis direction are determined according to the torque command value to perform vector control of the armature current (phase current) of the electric motor based on the determined armature current components id, iq. When the direction of the magnetic field of the electric motor is the d-axis direction, the armature current component id functions as exciting current and the armature current component iq functions as current for determining the output torque of the electric motor.

According to the d-q vector control, so-called magnetic field weakening control is performed in a high rpm range of the electric motor. In the magnetic field weakening control process, even if the output torque of the electric motor is relatively low, the armature current (phase current) of the electric motor generally becomes relatively large. To be more specific, in the magnetic field weakening control process, the armature current (phase current) of the electric motor is $\sqrt{(id^2+iq^2)}$, that is, the square root of $(id^2+iq^2)$. Therefore, the torque command value ($\propto iq$) is not proportional to the armature current of the electric motor in the magnetic field weakening control process. On the other hand, when the magnetic field weakening control is performed in a low rpm range of the electric motor, since the magnetic field weakening control is not performed, id is nearly equal to 0 (id≈0). In other words, the armature current of the electric motor is nearly equal to the armature current component iq and the torque command value is proportional to the armature current of the electric motor.

Therefore, when the apparatus further comprises motor control means for performing d-q vector control of the electric motor according to the torque command values as a process to control the operation of the electric motor in the structure of the present invention, the apparatus preferably further comprises torque command correcting means for correcting the torque command values according to at least the rotational speed of the electric motor so that the temperature transition estimating means will estimate the temperature transition of the electric motor using the corrected torque command values and an average value of the corrected torque command values, instead of the torque command values and the average value of the torque command values. Specifically, when the rotational speed of the electric motor is high, the torque command correcting means corrects the torque command value to increase the value.

According to this structure, when the magnetic field weakening control is performed at high rotational speed of the electric motor, the corrected torque command values and the average value of the corrected values can be made appropriate to the actual armature current value of the electric motor. The use of these corrected values and the average value of the corrected values as input parameters for fuzzy inference makes it possible to calculate the estimate of the temperature changes of the electric motor per unit time, and hence the temperature transition, correctly even after the magnetic field weakening control is carried out. Therefore, the control of the amount of coolant supply can be performed correctly in order to prevent overheating of the electric motor.

According to the d-q vector control, the relationship between the torque command value and the actual armature current of the electric motor is affected by the power-supply voltage (condenser voltage). Therefore, the torque command correcting means preferably corrects the torque command value according to the rotational speed of the electric motor and the power-supply voltage of the electric motor. In this case, since the actual armature current of the electric motor relative to the torque command value becomes larger as the power-supply voltage of the electric motor decreases, the torque command value is corrected preferably to increase the torque command value as the power-supply voltage of the electric motor decreases.

BRIEF DESCRIPTION OF THE DRAWINGS

FIG. 6 is a table showing fuzzy rules associated with the first fuzzy inference means shown in FIG. 2;

FIG. 9 is a table showing fuzzy rules associated with the second fuzzy inference means shown in FIG. 2;

DESCRIPTION OF THE PREFERRED EMBODIMENTS

An overheat preventing apparatus according to a first embodiment of the present invention will now be described with reference to FIGS. 1 through 12.

Figure 1:
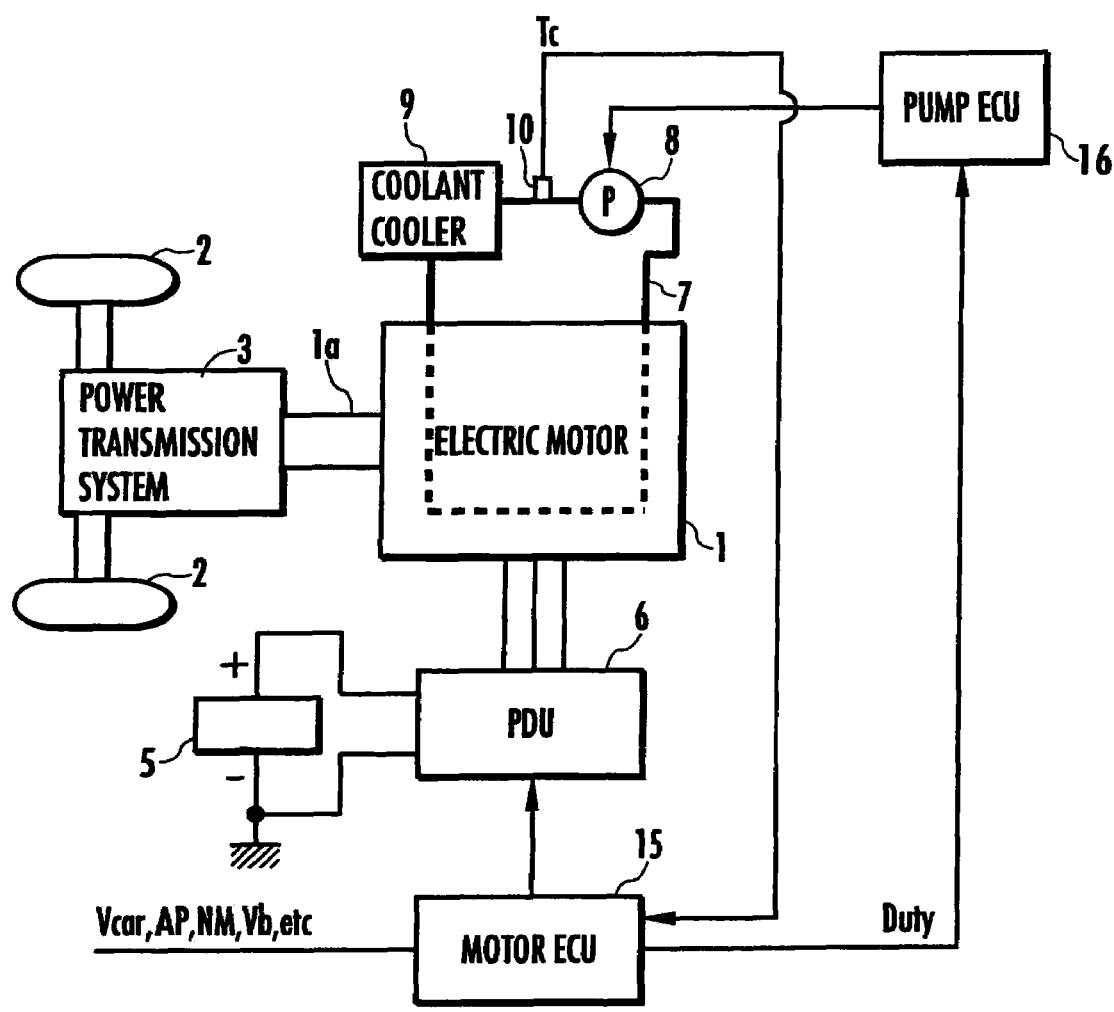
FIG. 1 is a schematic block diagram of the main part of a vehicle according to a first embodiment of the present invention.

The overheat preventing apparatus according to the embodiment is mounted on a hybrid vehicle or electric vehicle having an electric motor as a driving power source of the vehicle. FIG. 1 is a schematic block diagram of the main part of the vehicle (associated with the overheat preventing apparatus of the embodiment).

In FIG. 1, reference numeral 1 designates an electric motor and reference numerals 2, 2 designate drive wheels. The electric motor 1 has a rotating shaft 1a rotating integrally with a rotor, not shown, of the electric motor 1, and the rotating shaft 1a is coupled to the drive wheels 2, 2 through a power transmission system 3, comprising a gear, a transmission, a differential gear mechanism and the like, so that power transmission (rotation transmission) will be carried out between the rotating shaft 1a of the electric motor 1 and the drive wheels 2, 2 through the power transmission system 3.

In the embodiment, the electric motor 1 is a three-phase brushless motor electrically connected to a condenser 5 through a power drive circuit or motor drive circuit 6 (hereinafter referred to as "PDU 6") so that electric power can be exchanged with the condenser 5 as its power source through the PDU 6. When the electric motor 1 is operating in a power mode, electric power is supplied from the condenser 5 to the electric motor 1 through the PDU 6, while when it is operating in a regenerative mode (when it is regenerating electric power), the regenerated electric power is supplied to the condenser 5 through the PDU 6 to recharge the condenser 5. In some implementations, the condenser 5 may be replaced with a battery, such as a secondary battery. The condenser 5 may also be connected to a fuel condenser from which electric power can be supplied to recharge the condenser 5.

A coolant circulating path 7 provided through the inside of the electric motor 1 is connected to the electric motor 1 to absorb heat generated by the electric motor 1 during operation (during passage of electric current). An electric pump 8 and a coolant cooler 9 are inserted in the coolant circulating path 7 outside of the electric motor 1 so that, when the electric pump 8 is actuated, a coolant (oil in the embodiment) will be circulated in the coolant circulating path 7 through the electric motor 1. During the circulation of the coolant, the coolant cooler 9 cools down the coolant that has absorbed heat from the electric motor 1. The coolant cooler 9 is, for example, a heat sink such as a radiator. A coolant temperature sensor 10 for detecting the temperature of the coolant flowing through the coolant circulating path 7 (corresponding to coolant temperature sensing means of the present invention) is inserted in the coolant circulating path 7.

In the embodiment, the electric pump 8 is actuated by the application of a predetermined periodic pulse voltage. The discharge flow rate, that is, the amount of coolant flowing through the coolant circulating path 7 into the electric motor 1 (coolant supply to the electric motor 1) can be controlled (changed) by changing the duty cycle, or duty ratio Duty, of voltage pulses. The electric pump 8 corresponds to coolant supplying means of the present invention.

The overheat preventing apparatus of the embodiment includes a motor controller 15 (hereinafter referred to as "motor ECU 15") for fuzzy inference processing and a pump controller 16 (hereinafter referred to as "pump ECU 16") for control of the operation of the electric pump 8. The motor ECU 15 and the pump ECU 16 consist of electronic circuits including CPUs, respectively. The motor ECU 15 and the pump ECU 16 may be one controller having both functions.

A detected value of coolant temperature Tc from the coolant temperature sensor 10 is input into the motor ECU 15. Other detected values from various other sensors, not shown, are also input into the motor ECU 15, such as vehicle speed Vcar, depressed amount (amount of operation) AP of an accelerator pedal (hereinafter referred to as "accelerator manipulated variable AP"), rotational speed NM of the electric motor 1, output voltage Vb of the condenser (hereinafter referred to as "condenser voltage Vb), and so on. The motor ECU 15 controls the operation of the electric motor 1 through the PDU 6 based on the input data and a prestored program, while it determines a duty ratio Duty for the pulse voltage to instruct the pump ECU 16 of the value Duty. The pump ECU 16 generates a pulse voltage with the duty ratio Duty instructed from the Motor ECU 15 and applies the voltage to the electric pump 8 to control the operation of the electric pump 8.

Figure 2:
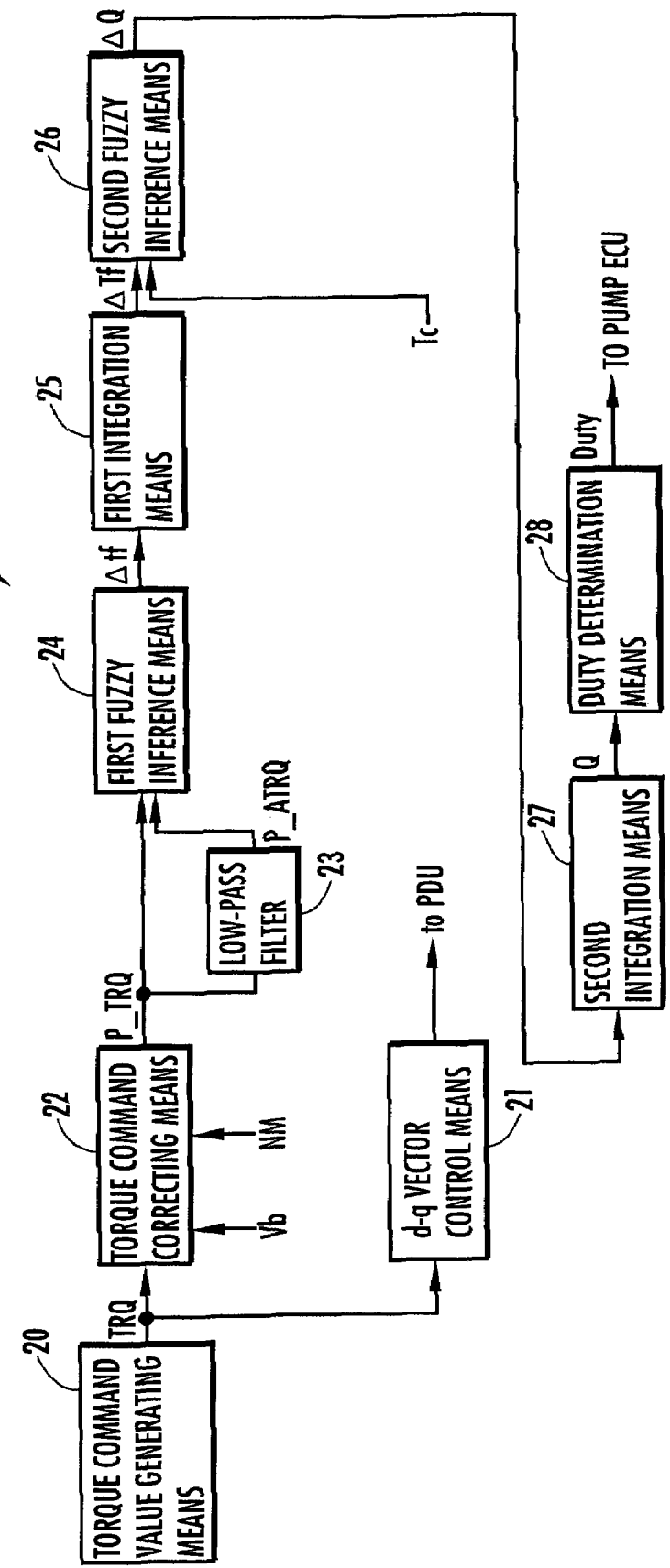
FIG. 2 is a block diagram showing the functional components of a motor ECU (controller) shown in FIG. 1.

In the embodiment, since the processing capability of the motor ECU 15 is closely related to the subject matter of the present invention, the motor ECU 15 will be described in detail with reference to FIG. 2. FIG. 2 is a block diagram showing functional components of the motor ECU 15.

The ECU15 includes, as its functional components, torque command value generating means 20 for sequentially generating command values TRQ for torque to be produced by the electric motor 1, d-q vector control means 21 for performing d-q vector control on the armature current of the electric motor 1 to allow the electric motor 1 to generate torque according to a corresponding torque command value TRQ, torque command correcting means 22 for correcting the torque command values TRQ according to the condenser voltage Vb and the rotational speed NM of the electric motor 1, a low-pass filter 23 for performing low-pass filtering (e.g., moving average processing) on each of the torque command values P_TRQ corrected by the torque command correcting means 22 (hereinafter referred to as "corrected torque command value P_TRQ") to calculate an average value P_ATRQ of the corrected torque command values P_TRQ (hereinafter referred to as "average corrected torque command value P_ATRQ"), first fuzzy inference means 24 for sequentially determining inferred values Δtf of temperature changes of the electric motor 1 (hereinafter referred to as "inferred temperature change Δtf") caused by the passage of electric current through the electric motor 1 at each cycle time (every control cycle of the motor ECU 15) according to fuzzy inference operations using the average corrected torque command value P_ATRQ and the corrected torque command values P_TRQ as input parameters, and first integration means 25 for sequentially adding up (integrating) a series of inferred temperature changes Δtf to determine an estimate ΔTf of temperature transition in the electric motor 1 (hereinafter referred to as "temperature transition estimate ΔTf") caused by the passage of electric current through the electric motor 1.

The motor ECU 15 also includes second fuzzy inference means 26 for sequentially determining corrective values ΔQ for correcting the discharge rate of the electric pump 8 as an amount of operation of the electric pump 8, that is, corrective values for the amount of coolant flowing through the coolant circulating path 7 (hereinafter referred to as "coolant flow adjusting value") according to fuzzy inference operations using the temperature transition estimate ΔTf and the detected value of coolant temperature Tc from the coolant temperature sensor 10, second integration means 27 for integrating a series of coolant flow adjusting values ΔQ sequentially determined by the second fuzzy inference means 26 to determine a desired value Q for the discharge rate of the electric pump 8 (a target discharge rate of the electric pump 8), and duty determining means 28 for determining, based on the desired value Q for the discharge rate, the duty ratio Duty of voltage pulses to be applied to the electric pump 8.

The first fuzzy inference means 24 corresponds to temperature change estimating means of the present invention, and the first integration means 25 corresponds to integration means of the present invention. The first fuzzy inference means 24 and the first integration means 25 constitute temperature transition estimating means of the present invention. The second fuzzy inference means 26, the second integration means 27, the duty determining means 28, and the pump ECU 16 constitute coolant supply control means of the present invention.

The torque command value generating means 20 sequentially generates a series of torque command values TRQ for the torque to be produced by the electric motor 1 depending on the running state of the vehicle, as described in specific detail later on. The generated torque command values TRQ include a torque command value for the power mode of the electric motor 1 and a torque command value for the regenerative mode (power generating mode) of the electric motor 1. In the embodiment, the torque command value TRQ for the power mode is a positive value, whereas the torque command value TRQ for the regenerative mode is a negative value.

The d-q vector control means 21 determines, depending on the torque command value TRQ, an armature current component id in a d-axis direction and an armature current component iq in a q-axis direction in a virtual equivalent circuit of the armature circuit of the electric motor 1 in a d-q coordinate system having the d-axis representing the direction of the magnetic field of the electric motor 1 and the q-axis representing a direction orthogonal to the direction of the magnetic field. The d-q vector control means 21 then controls, through the PDU 6, the armature current (phase current) of the electric motor 1 based on the determined armature current components id, iq to allow the electric motor 1 to produce torque according to the torque command value TRQ. The d-q vector control means 21 also performs magnetic field weakening control in a high rmp torque range of the electric motor 1 (in an rpm range higher than a predetermined rpm range) to increase the armature current component id as exciting current so as to weaken the magnetic flux from a magnet (not shown) of the electric motor 1. The above basic d-q vector control technique will not further be described below because the technique including the magnetic field weakening control is known in the art.

The torque command correcting means 22 corrects the torque command value TRQ (more precisely, its absolute value |TRQ|) in order to compensate for the awkward fact that the magnitude (absolute value) of the torque command value TRQ and the armature current (phase current) of the electric motor 1 fail to show a proportional relationship because of the magnetic field weakening control of the d-q vector control means 21. According to the d-q vector control including the magnetic field weakening control, when the torque command value TRQ is constant (which is equivalent to when the armature current component iq in the q-axis direction is kept constant), the armature current component id in the d-axis direction increases as the rpm of the electric motor increases, making the actual armature current of the electric motor 1 larger. When the torque command value TRQ is constant, the armature current of the electric motor 1 is slightly affected by the condenser voltage Vb as the power supply voltage for the electric motor 1. As a result, the armature current (phase current) of the electric motor 1 becomes somewhat larger as the condenser voltage Vb is lower.

That is why the torque command correcting means 34 determines a corrective value ΔTRQ for the torque command value TRQ from the rotational speed NM of the electric motor 1 and the condenser voltage Vb using a preset map. In the map used here, the corrective value ΔTRQ is basically larger as the rotational speed NM of the electric motor 1 is higher and as the condenser voltage Vb is lower. The torque command correcting means 22 adds the determined corrective value ΔTRQ to the absolute value |TRQ| of the torque command value TRQ to determine the corrected torque command value P_TRQ (=|TRQ|+ΔTRQ). The corrected torque command value P_TRQ thus determined by correcting the torque command value TRQ is substantially proportional to the actual armature current ($=\sqrt{(id^2+iq^2)}$, that is, the square root of ($id^2+iq^2$)) of the electric motor 1 according to the d-q vector control.

If the rotational speed NM of the electric motor 1 is low (i.e., a low speed to make id≈0) and the condenser voltage Vb is relatively high (i.e., normal condenser voltage Vb), then ΔTRQ≈0, and in this case, P_TRQ≈|TRQ|.

The first fuzzy inference means 24 stores, in a memory not shown, predetermined membership functions and a plurality of fuzzy rules in order to determine estimated temperature changes Δtf from the corrected torque command values P_TRQ and the average corrected torque command value P_ATRQ as input parameters.

The membership functions associated with the first fuzzy inference means 24 include first membership functions for classifying and expressing the order of magnitude of each corrected torque command value P_TRQ, and second membership functions for classifying and expressing the order of magnitude of each average corrected torque command value P_ATRQ.

Figure 3:
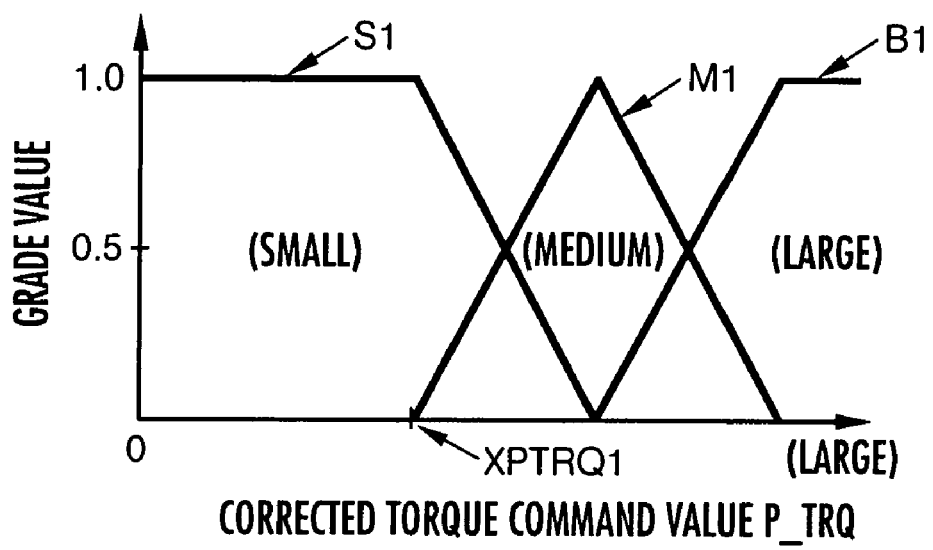
FIG. 3 is a graph showing membership functions associated with first fuzzy inference means shown in FIG. 2.

As shown in FIG. 3, the first membership functions include three kinds of membership functions, that is, a trapezoidal membership function S1 corresponding to a small order of magnitude of the corrected torque command value P_TRQ, a triangular membership function M1 corresponding to a medium order of magnitude of the corrected torque command value P_TRQ, and a trapezoidal membership function B1 corresponding to a large order of magnitude of the corrected torque command value P_TRQ.

The first membership functions S1, M1, B1 represent modeling of the amount of heat (Joule heat) generated by the electric motor 1 (or more specifically, the amount of heat generated by the armature of the electric motor 1 per unit time) with respect to the corrected torque command value P_TRQ. In other words, since the amount of heat generated by the armature of the electric motor 1 is proportional to the square of the armature current, it is proportional to the square of the corrected torque command value P_TRQ determined as described above. For modeling the characteristics (non-linear characteristics) of the amount of heat generated by the armature of the electric motor 1 corresponding to the corrected torque command value P_TRQ using membership functions, it is preferable to use the above three membership functions S1, M1, B1.

When the electric motor 1 is operating at normal output torque, for example, equal to or lower than rated torque (the maximum torque to allow the electric motor 1 to operate continuously without difficulty), the temperature of the electric motor 1 under such a condition that the output torque of the electric motor 1 is continuously maintained constant is typically saturated at (converged to) a certain constant temperature, e.g., 120 degrees C., and does not rise too high to impair the performance of components, such as a magnet, provided in the electric motor 1. In other words, when the electric motor 1 is operating with output torque equal to or lower than the rated torque, since the temperature of the electric motor 1 remains within a range that allows the electric motor 1 to operate continuously without difficulty, the electric motor 1 does not overheat. In order to prevent the electric motor 1 from overheating, a problem arises with a temperature rise of the electric motor 1 accompanied by the heat generation of the armature of the electric motor 1 (caused by Joule heat) when the electric motor 1 is operating with output torque that exceeds the rated torque.

For this reason, the first membership functions S1, M1, B1 in the embodiment model the amount of heat (the amount of heat generated by Joule heat) of the electric motor 1 operating with output torque that exceeds the rated torque. For example, the order of magnitude of the corrected torque command value P_TRQ equal to or lower than a preset value XPTRQ1 equal to or near the rated torque value is referred to as "small", and the membership function S1 is established such that the grade value of the smallest membership function S1 in the relation of $P\_TRQ \leqq XPTRQ1$ is "1". When the corrected torque command value P_TRQ exceeds XPTRQ1, the grade value of the membership function S1 becomes gradually smaller and the grade value of the medium membership function M1 becomes gradually larger as the magnitude of the corrected torque command value P_TRQ increases. When the magnitude of the corrected torque command value P_TRQ further increases until the grade value of the medium membership function M1 reaches "1", the grade value of the membership function S1 becomes "0". When the magnitude of the corrected torque command value P_TRQ further increases, the grade value of the medium membership function M1 decreases gradually from "1" to "0", and the graded value of the membership function B1 increases gradually from "0" to "1".

Figure 4:
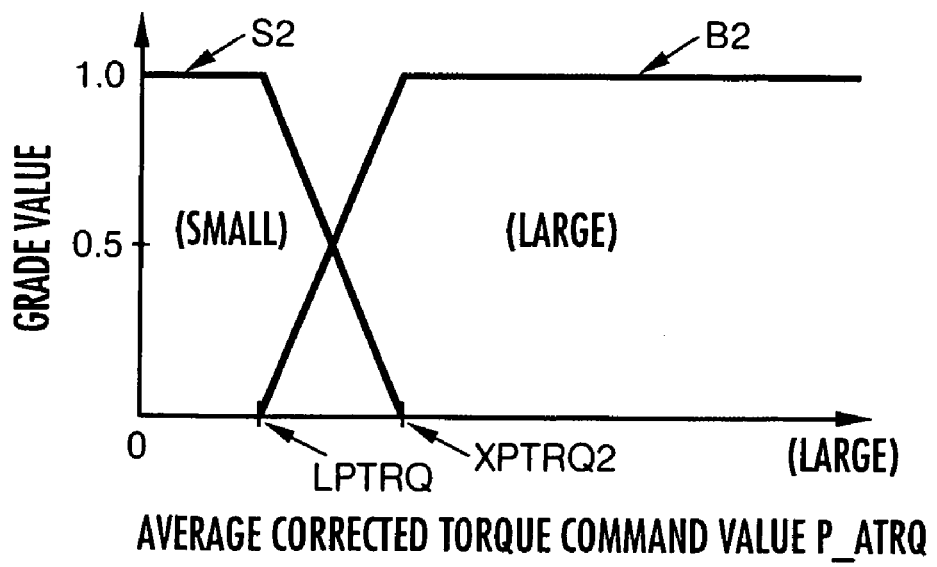
FIG. 4 is a graph showing membership functions associated with the first fuzzy inference means shown in FIG. 2.

As shown in FIG. 4, the second membership functions include two kinds of membership functions, that is, a trapezoidal membership function S2 corresponding to a relatively small order of magnitude of the average corrected torque command value P_ATRQ and a trapezoidal membership function B2 corresponding to a relatively large order of magnitude of the average corrected torque command value P_ATRQ.

Figure 5:
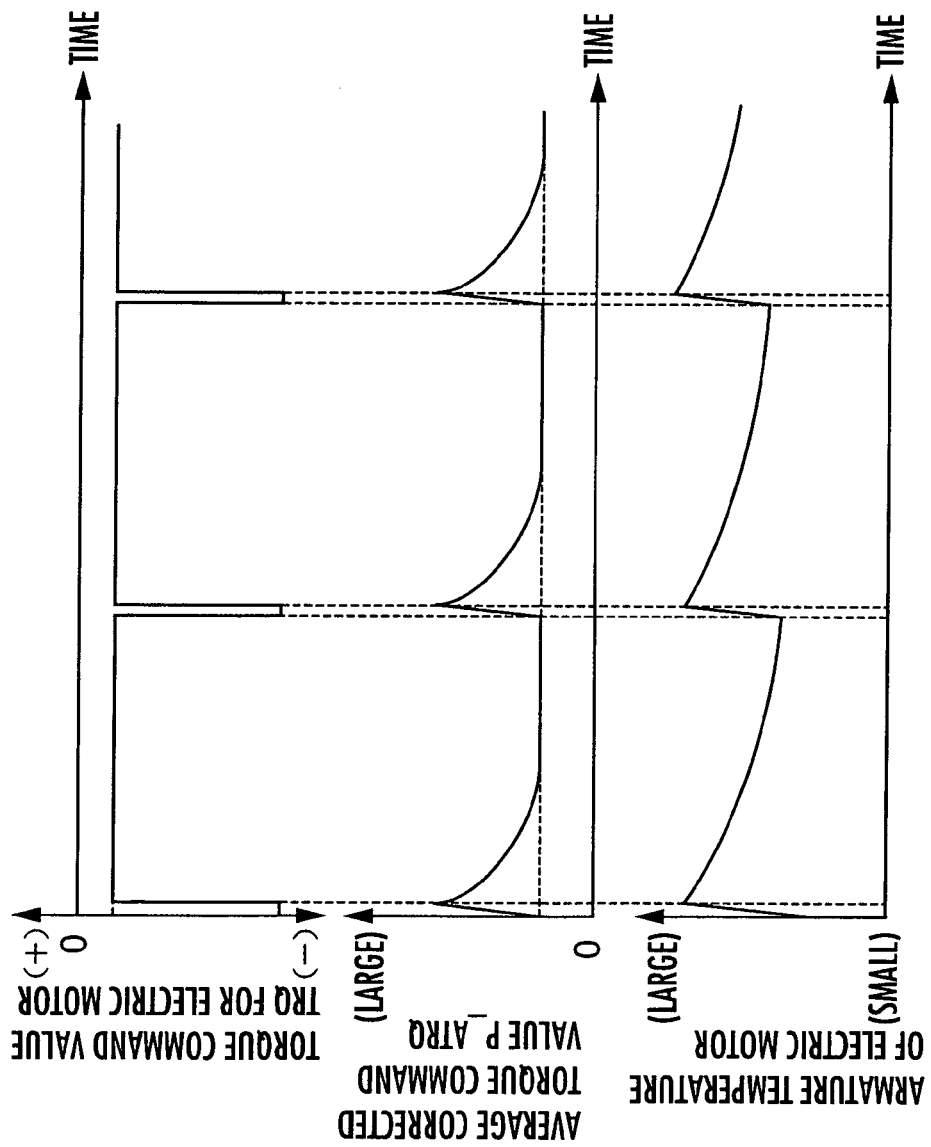
FIG. 5 is a graph illustrating the relationships among torque command values and average corrected torque command values for an electric motor, and actual temperatures of an armature of the electric motor according to the first embodiment of the present invention.

The second membership functions S2 and B2 represent modeling of the tendency of temperature changes of the electric motor 1 (resulting from the passage of electric current through the electric motor 1) with respect to the average corrected torque command value P_ATRQ. To be specific, they model an increasing tendency of the temperature of the electric motor 1 and a decreasing tendency of the temperature of the electric motor 1, respectively. As shown in FIG. 5, the average corrected torque command value P_ATRQ shows a strong correlation with an actual temperature change of the armature of the electric motor 1. Since the average armature current becomes larger as the magnitude of the average corrected torque command value P_ATRQ increases, the actual temperature of the armature of the electric motor 1 has an increasing tendency. On the other hand, since the average armature current becomes smaller as the magnitude of P_ATRQ decreases, the actual temperature of the armature of the electric motor 1 has a decreasing tendency. FIG. 5 illustrates a varying pattern of the average corrected torque command value P_ATRQ in the middle part and a varying pattern of the temperature of the armature of the electric motor 1 (a varying pattern of measured temperature values) in the lower part, when the torque command value changes as shown in the upper part (in this example, it changes in the order of values smaller than "0", that is, when the electric motor 1 is in the regenerative mode).

For modeling the tendencies of the temperature changes of the electric motor 1 using membership functions, the embodiment uses the above two kind of membership functions S2 and B2. When the average corrected torque command value P_ATRQ is larger than the value of the rated torque, the temperature of the electric motor 1 increases in excess of the steady-state temperature of the electric motor 1 which eventually converges to a temperature, that is, an upper limit temperature that allows the electric motor 1 to operate continuously without difficulty (hereinafter referred to as "steady-state temperature").

Therefore, in the embodiment, the order of magnitude of the average corrected torque command value P_ATRQ larger than a preset value XPTRQ2 equal to or near the rated torque value as shown in FIG. 4 is referred to as "large", and the second membership function B2 is established such that the grade value of the second membership function B2 in the relation of P_ATRQ>XPTRQ2 is "1". The preset value XPTRQ2 may be the same value as the preset value XPTRQ1 associated with the first membership functions, or a slightly different value.

When the average corrected torque command value P_ATRQ is small enough with respect to the value of the rated torque, for example, when it is smaller than a predetermined value LPTRQ (<XPTRQ2) shown in FIG. 4, the temperature of the electric motor 1 becomes lower than the steady-state temperature mentioned above. Therefore, in the embodiment, the order of magnitude of the average corrected torque command value P_ATRQ smaller than LPTRQ is referred to as "small", and the membership function S2 is established such that the grade value of the membership function S2 in the relation of P_ATRQ<XPTRQ2 is "1". When the average corrected torque command value P_TRQ fall within the range between the predetermined values LPTRQ and XPTRQ", the grade value of the membership function S2 decreases gradually from "1" to "0", and the graded value of the membership function B2 increases gradually from "0" to "1".

The fuzzy rules associated with the first fuzzy inference means 24 are such that the order of magnitude of the corrected torque command value P_TRQ and the order of magnitude of the average corrected torque command value P_ATRQ, which are defined by the first membership functions S1, M1, B1 and the second membership functions S2, B2, respectively, are the antecedents in the fuzzy rules, and the order of magnitude of a temperature change of the electric motor 1 (i.e., the amount of temperature changes per unit time caused by the passage of electric current through the electric motor 1) corresponding to the corrected torque command value P_TRQ and the average corrected torque command value P_ATRQ is the consequents in the fuzzy rules. For example, six kinds of fuzzy rules are established as shown in FIG. 6. The amount of temperature change means the amount of temperature change caused by Joule heat during the passage of electric current.

In the embodiment, the order of magnitude of the temperature change in the consequent part of the fuzzy rules means the order of magnitude of the temperature change of the electric motor 1 relative to the steady-state temperature mentioned above. In order to simplify the fuzzy inference operation in the embodiment, the order of magnitude of the temperature change in the consequent part of the fuzzy rules is represented by one of preset values A1 to A6 of temperature changes for the fuzzy rules (hereinafter referred to as "set temperature changes A1 to A6"), and Y in the consequent part of each fuzzy rule takes one of the values of the set temperature changes A1 to A6. The set temperature change A1 corresponding to a drop in the temperature of the electric motor 1 (rule No. 1) is a negative value, and the set temperature changes A2 to A6 corresponding to increasing values for the temperature of the electric motor 1 (rule Nos. 2 to 6) are positive values. The set temperature changes A2 to A6 corresponding to increasing values for the temperature of the electric motor 1 take on larger values in the order of the rules "small", "medium", and "large" in the consequent part. Specifically, the values of the set temperature changes A4 and A5 are larger than the values of the set temperature changes A2 and A3, and the value of the set temperature change A6 is larger than the values of the set temperature changes A4 and A5. The values of the set temperature changes A1 to A6 are predetermined based on experimental results.

The first fuzzy inference means 24 uses the first membership functions S1, M1, B1, the second membership functions S2, B2, and the fuzzy rules thus established to determine, sequentially at each cycle time (every control cycle of the motor ECU 15), the estimated temperature changes Δtf from the corrected torque command values P_TRQ and the average corrected torque command value P_ATRQ according to fuzzy inference operations described below.

In other words, grade values (goodness-of-fit values) are determined for the corrected torque command value P_TRQ and the average corrected torque command value P_ATRQ in the antecedent part given from the torque command correcting means 22 and the low-pass filter 23 respectively to determine, as an estimate of temperature changes Δtf, a weighted center (weighted average) of the set temperature changes A1 to A6 using the grade values as weighting factors for the temperature changes A1 through A6 in the consequent part of the fuzzy rules.

Specifically, if the grade values of the first membership functions S1, M1, B1 for the given corrected torque command value P_TRQ are represented by PT(S1), PT(M1), PT(B1) and the grade values of the second membership functions S2, B2 for the given average corrected torque command value P_ATRQ are represented by PA(S2), PA(B2), then the estimated temperature change Δtf is determined by the following equation (1):

$$\Delta tf = \{PT(S1) \cdot PA(S2) \cdot A1 + PT(S1) \cdot PA(B2) \cdot A2 + \\ PT(M1) \cdot PA(S2) \cdot A3 + PT(M1) \cdot PA(B2) \cdot A4 + \\ PT(B1) \cdot PA(S2) \cdot A5 + PT(B1) \cdot PA(B2) \cdot A6\} \div \\ \{PT(S1) \cdot PA(S2) + PT(S1) \cdot PA(B2) + PT(M1) \cdot PA(S2) + \\ PT(M1) \cdot PA(B2) + PT(B1) \cdot PA(S2) + PT(B1) \cdot PA(B2)\}$$

(1)

The estimated temperature change Δtf thus determined represents the temperature changes of the electric motor 1 (temperature changes caused by the passage of electric current through the electric motor 1) at each predetermined cycle time (per unit time). The first integration means 25 integrates (adds up) Δtf to determine a temperature transition estimate as an estimate of the temperature transition in the electric motor 1 caused by the passage of electric current through the electric motor 1. The temperature transition estimate represents an estimated pattern of temperature changes over time relative to the steady-state temperature.

In the embodiment, in a situation where the electric motor 1 is operating at normal output torque, that is, where the corrected torque command value P_TRQ varies in the range between the rated torque value, the preset value XPTRQ or XPTRQ2, and the predetermined value LPTRQ, the membership functions S1, M1, B1, S2, B2 and the set temperature changes A1 to A6 in the consequent part of the fuzzy rules are set to maintain, at substantially "0", the temperature transition estimate ΔTf determined by the first integration means 25 by integrating the estimated temperature changes Δtf. This enables the temperature transition estimate ΔTf to be calculated in a temperature range exceeding the steady-state temperature In addition, in the embodiment, the values of the set temperature changes A1 to A6 in the consequent part of the fuzzy rules are so established that the first integration means 25 will determine the temperature transition estimate ΔTf as a relative value with an upper limit of "1". Thus, the temperature transition estimate ΔTf represents a transition of relative temperature changes (a pattern of temperature changes) in the temperature region above the steady-state temperature, rather than directly representing a transition of values for the temperature of the electric motor 1.

The second fuzzy inference means 26 stores, in a memory not shown, predetermined membership functions and a plurality of fuzzy rules in order to determine the coolant flow adjusting value ΔQ from the temperature transition estimate ΔTf and the coolant temperature Tc (detected value) as input parameters.

The membership functions associated with the second fuzzy inference means 26 include third membership functions for classifying and expressing the order of magnitude of the temperature transition estimate ΔTf, and fourth membership functions for classifying and expressing the order of magnitude of the coolant temperature Tc.

Figure 7:
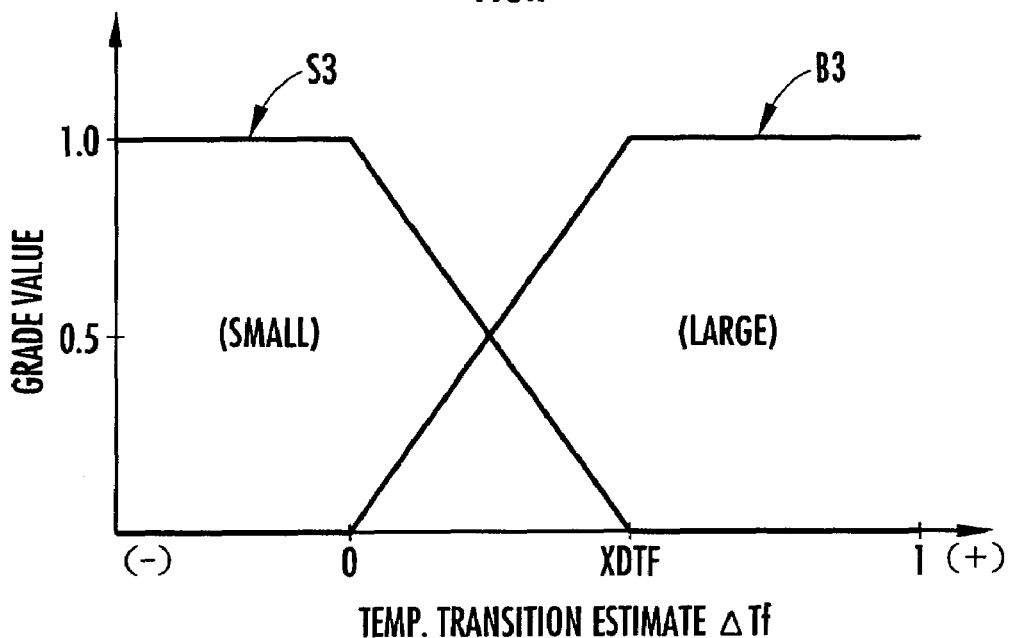
FIG. 7 is a graph showing membership functions associated with second fuzzy inference means shown in FIG. 2.

As shown in FIG. 7, the third membership functions include two kinds of membership functions, that is, a trapezoidal membership function S3 corresponding to a relatively small order of magnitude of the temperature transition estimate ΔTf, and a trapezoidal membership function B3 corresponding to a relatively large order of magnitude of the temperature transition estimate ΔTf.

In the embodiment, the order of magnitude of the temperature transition estimate ΔTf equal to or below "0" is referred to as "small", and the membership function S3 is established such that the grade value of the membership function S3 in the relation of ΔTf<0 is "1". If ΔTf<0, it means that the temperature of the electric motor 1 will converge to a temperature equal to or below the steady-state temperature because the heat generation of the electric motor 1 resulting from the passage of electric current therethrough is relatively low. Further, in the embodiment, the order of magnitude of the temperature transition estimate ΔTf equal to or above a predetermined positive value XDTF is referred to as "large", and the membership function B3 is established such that the grade value of the membership function B3 in the relation of ΔTf>XDTF is "1". If ΔTf>XDTF, it means that, because the heat generation of the electric motor 1 resulting from the passage of electric current therethrough is high, the discharge rate of the electric pump 8 should be increased (to increase the amount of heat absorbed by the coolant from the electric motor 1) so that the electric motor 1 will be actively cooled. When the temperature transition estimate ΔTf falls within the range between 0 and XDTF, the grade value of the membership function S3 decreases gradually from "1" to "0", and the graded value of the membership function B3 increases gradually from "0" to "1".

Figure 8:
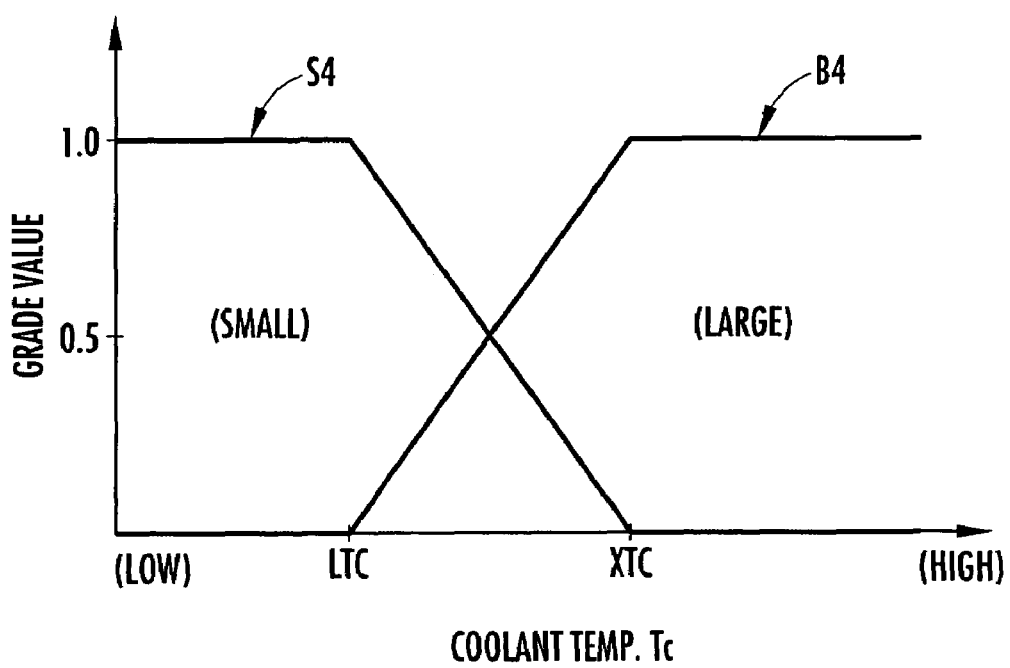
FIG. 8 is a graph showing membership functions associated with the second fuzzy inference means shown in FIG. 2.

As shown in FIG. 8, the fourth membership functions include two kinds of membership functions, that is, a trapezoidal membership function S4 corresponding to a relatively low range of coolant temperatures Tc, and a trapezoidal membership function B4 corresponding to a relatively high range of coolant temperatures Tc.

In the embodiment, the range of coolant temperatures Tc equal to or below a predetermined temperature LTC is referred to as "small", and the membership function S4 is established such that the grade value of the membership function S4 in the relation of Tc<LTC is "1". If Tc<LTC, it means that the amount of heat absorbed by the coolant from the electric motor 1 (the amount of heat absorbed per unit time) will increase. Further, in the embodiment, the range of coolant temperatures Tc equal to or above a predetermined temperature XTC (>LTC) is referred to as "large", and the membership function B4 is established such that the grade value of the membership function B4 in the relation of Tc>XTC is "1". If Tc>LTC, it means that the amount of heat absorbed by the coolant from the electric motor 1 (the amount of heat absorbed per unit time) will decrease. When the coolant temperature Tc falls within the range between LTC and XTC, the grade value of the membership function S4 decreases gradually from "1" to "10", and the graded value of the membership function B4 increases gradually from "0" to "1".

The fuzzy rules associated with the second fuzzy inference means 26 are such that the order of magnitude of the temperature transition estimate ΔTf and the range of the coolant temperature Tc, which are defined by the above-mentioned third membership functions S3, B3 and fourth membership functions S4, B4, respectively, are the antecedents in the fuzzy rules, and the order of magnitude of the coolant flow adjusting value ΔQ (corrective value for the discharge rate of the electric pump 8) corresponding to the temperature transition estimate ΔTf and the coolant temperature Tc is the consequent of the fuzzy rules. For example, four kinds of fuzzy rules (rule Nos. 7 to 10) are established as shown in FIG. 9.

In the embodiment, in order to simplify the fuzzy inference operation of the second fuzzy inference means 26, the order of magnitude of the coolant flow adjusting value ΔQ in the consequent part of the fuzzy rules is represented by set values A7 through A10 of coolant flow adjusting amounts predetermined for the respective rules (hereinafter referred to as "set coolant flow adjusting values A7 to A10), and Y in the consequent part of the fuzzy rules takes on the set coolant flow adjusting values A7 to A10. The set coolant flow adjusting value A7 corresponding to a case where the coolant flow needs decreasing (rule No. 7) is a negative value, and the set coolant flow adjusting values A8 to A10 corresponding to cases where the coolant flow needs increasing (rule Nos. 8 to 10) are positive values. The magnitudes of the set coolant flow adjusting values A8 to A10 corresponds to the cases where the coolant flow needs increasing increase in the order of "small", "medium", and "large" in the consequent part of the fuzzy rules, respectively. The magnitudes of the set coolant flow adjusting values A7 to A10 are predetermined based on experimental results so that the electric motor 1 will be prevented from overheating as long as each state in the antecedent of the fuzzy rules is maintained.

In the embodiment, the second fuzzy inference means 26 uses the third membership functions S3, B3, the fourth membership functions S4, B4, and the fuzzy rules thus established to sequentially determine the coolant flow adjusting value ΔQ at each predetermined cycle time from the temperature transition estimate ΔTf and the coolant temperature Tc (detected value) according to a fuzzy inference operation described below.

In other words, the second fuzzy inference means 26 determines grade values (goodness-of-fit value) in the antecedent part of each of the fuzzy rules shown in FIG. 9 for the temperature transition estimate ΔTf and the coolant temperature Tc obtained from the first integration means 25 and the coolant temperature sensor 10, respectively, to determine, as a coolant flow adjusting value ΔQ, a weighted center (weighted average) for each of the set coolant flow adjusting values A7 to A10 using the grade values as weighting factors for each of the set coolant flow adjusting values A7 to A10.

Specifically, if the grade values of the third membership functions S3, B3 for the given temperature transition estimate ΔTf are Tf(S3), Tf(B3) and the grade values of the fourth membership functions S4, B4 for the given coolant temperature Tc are Tc(S4), Tc(B4), the coolant flow adjusting value ΔQ is determined by the following equation (2):

$$\Delta Q = \{Tf(S3) \cdot Tc(S4) \cdot A7 + Tf(B3) \cdot Tc(S4) \cdot A8 + Tf(S3) \cdot Tc(B4) \cdot A9 + Tf(B3) \cdot Tc(B4) \cdot A10\} \div \{Tf(S3) \cdot Tc(S4) + Tf(B3) \cdot Tc(S4) + Tf(S3) \cdot Tc(B4) + Tf(B3) \cdot Tc(B4)\} \qquad (2)$$

The discharge rate of the electric pump 8 may be adjusted depending on the coolant flow adjusting value ΔQ. In this case, however, the discharge rate of the electric pump 8 is prone to change so suddenly that the power consumption of the electric pump 8 will increase. To avoid this problem, the second integration means 27 in the embodiment integrates the series of coolant flow adjusting values ΔQ to determine a desired value Q for the discharge rate of the electric pump 8. The desired value Q for the discharge rate determined by the second integration means 27 is a relative value (in the range of 0 to 1) proportional to the discharge rate, rather than the discharge rate itself.

Figure 10:
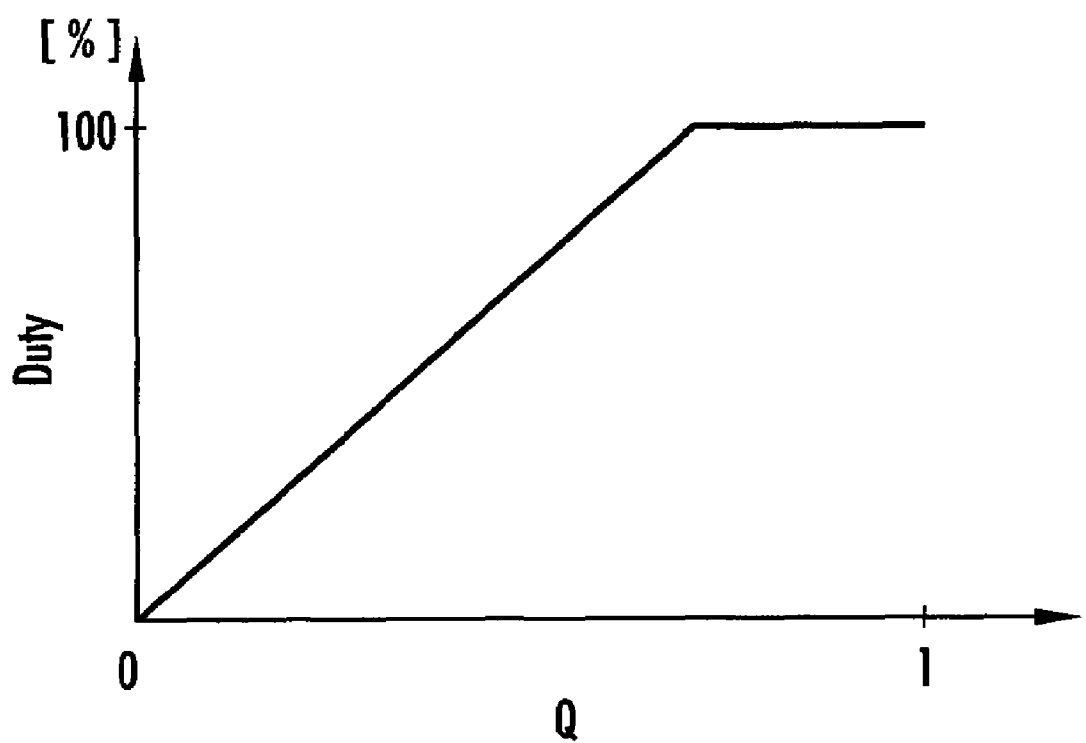
FIG. 10 is a graph showing a data table used in the processing operation of duty determining means shown in FIG. 2.

The duty determining means 28 determines a duty ratio Duty to be applied to the electric pump 8 from the desired value Q for the discharge rate of the electric pump 8 based on a predetermined data table. For example, the data table is so set that Duty will increase, as shown in FIG. 10, basically in proportion as the desired value Q for the coolant flow rate increases. The upper limit of Duty is 100 percent, and when the desired value Q exceeds a predetermined value, Duty is limited to the upper limit.

The general operation of the apparatus of the embodiment will next be described.

When the vehicle is running, the torque command value generating means 20 of the motor ECU 15 sequentially generates torque command values TRQ for the electric motor 1 based on the vehicle speed Vcar the detected value of the accelerator manipulated variable AP, and the like. The generated torque command values TRQ are positive values in cases where the electric motor 1 should operate in the power mode such as during acceleration of the vehicle, and negative values in cases where the electric motor 1 should operate in the regenerative mode such as during deceleration of the vehicle. The magnitude of the torque command value TRQ is determined according to the vehicle speed Vcar the detected value of the accelerator manipulated variable AP, and the like.

When the accelerator manipulated variable AP is large, the torque command value TRQ may exceed the rated torque of the electric motor 1. Therefore, the d-q vector control means 21 controls the armature current of the electric motor 1 through the PDU 6 according to the generated command value TRQ in the manner mentioned above so that the electric motor 1 will operate at the output torque corresponding to the torque command value TRQ in the power or regenerative mode. In the power mode of the electric motor 1, the output torque of the electric motor 1 is transmitted to the drive wheels 2, 2 through the power transmission system 3. In the regenerative mode of the electric motor 1, the electric motor 1 carries out a regenerative operation using kinetic energy transmitted from the drive wheels 2, 2 through the transmission system 3 so that power generated by the regenerative operation will be stored in the condenser 5 to charge the condenser 5.

Figure 11:
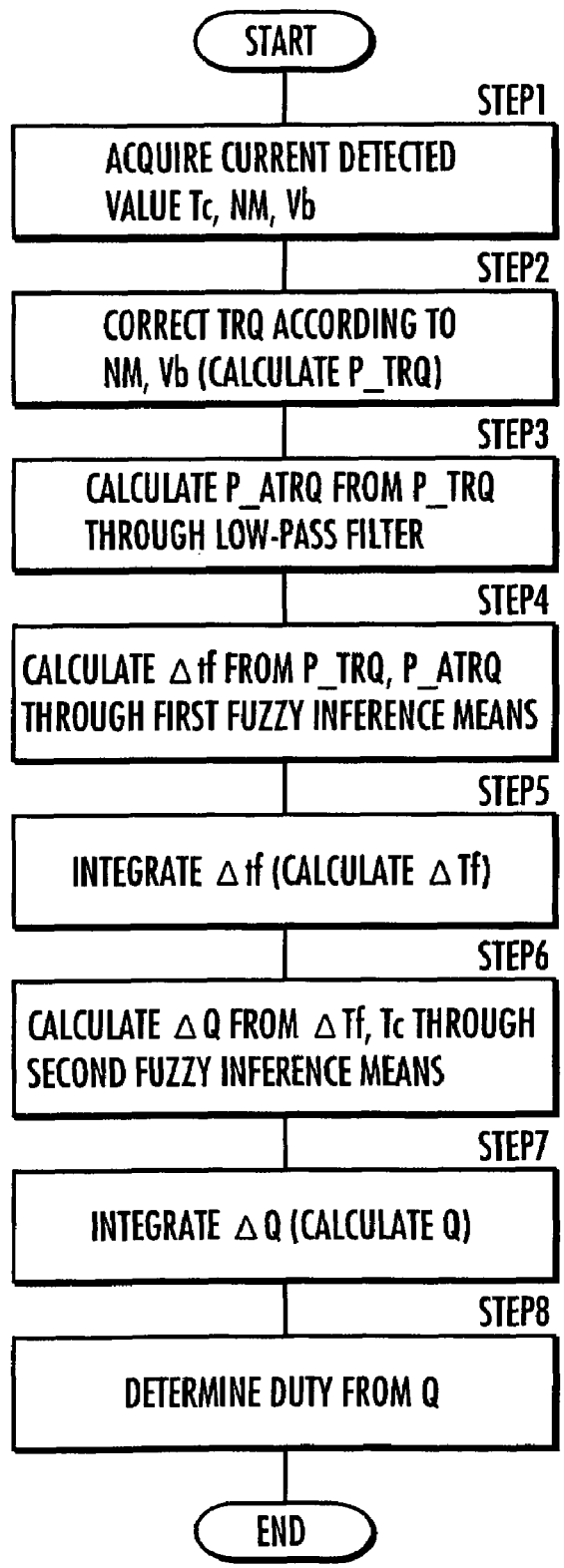
FIG. 11 is a flowchart showing the main part of control processing by the motor ECU according to the first embodiment of the present invention.

Along with the control of the operation of the electric motor 1, the motor ECU 15 executes a sequence of operations shown in a flowchart of FIG. 11 sequentially at every predetermined cycle time to determine a duty ratio Duty to be applied to the electric pump 8.

The following describes each step of the flowchart. In STEP 1, the motor ECU 15 first acquires the current detected value of the coolant temperature Tc from the coolant temperature sensor 10 while acquiring the current detected values of the rotational speed NM and the condenser voltage Vb of the electric motor 1 from other sensors, not shown.

Then, in STEP 2, the torque command value correcting means 22 of the motor ECU 15 corrects the torque command value TRQ generated by the torque command value generating means 20 in the manner mentioned above according to the current detected values of the rotational speed NM and the condenser voltage Vb of the electric motor 1 to calculate a corrected torque command value P_TRQ substantially proportional to the armature current of the electric motor 1.

In STEP 3, the low-pass filter 23 performs filtering to calculate an average corrected torque command value P_ATRQ as an average value of corrected torque command values P_TRQ.

In STEP 4, the first fuzzy inference means 24 calculates an inferred temperature change Δtf in the manner mentioned above from the corrected torque command values P_TRQ and the average corrected torque command value P_ATRQ. Further, in STEP 5, the first integration means 25 integrates inferred temperature changes Δtf to determine the above-mentioned temperature transition estimate ΔTf.

In STEP 6, the second fuzzy inference means 26 calculates a coolant flow adjusting value ΔQ in the manner mentioned above from the temperature transition estimate ΔTf and the current detected value of the coolant temperature Tc. Further, in STEP 7, the second integration means 27 integrates coolant flow adjusting values ΔQ to determine a desired value Q for the discharge rate of the electric pump 8.

In STEP 8, the duty determining means 28 determines a duty ratio Duty in the manner mentioned above from the desired value Q for the discharge rate based on the data table shown in FIG. 10.

The duty ratio Duty determined by the motor ECU 15 through the sequence of operations shown in FIG. 11 is given from the motor ECU 15 to the pump ECU 16. The pump ECU 16 generates pulse voltage with the given duty ratio Duty and applies them to the electric pump 8. As a result, the discharge rate of the electric pump 8, and hence the coolant flow rate in the coolant circulating path 7, is adjusted to a flow rate according to the duty ratio Duty of the given pulse voltage (basically proportional to the desired value Q of the coolant flow rate).

Figure 12:
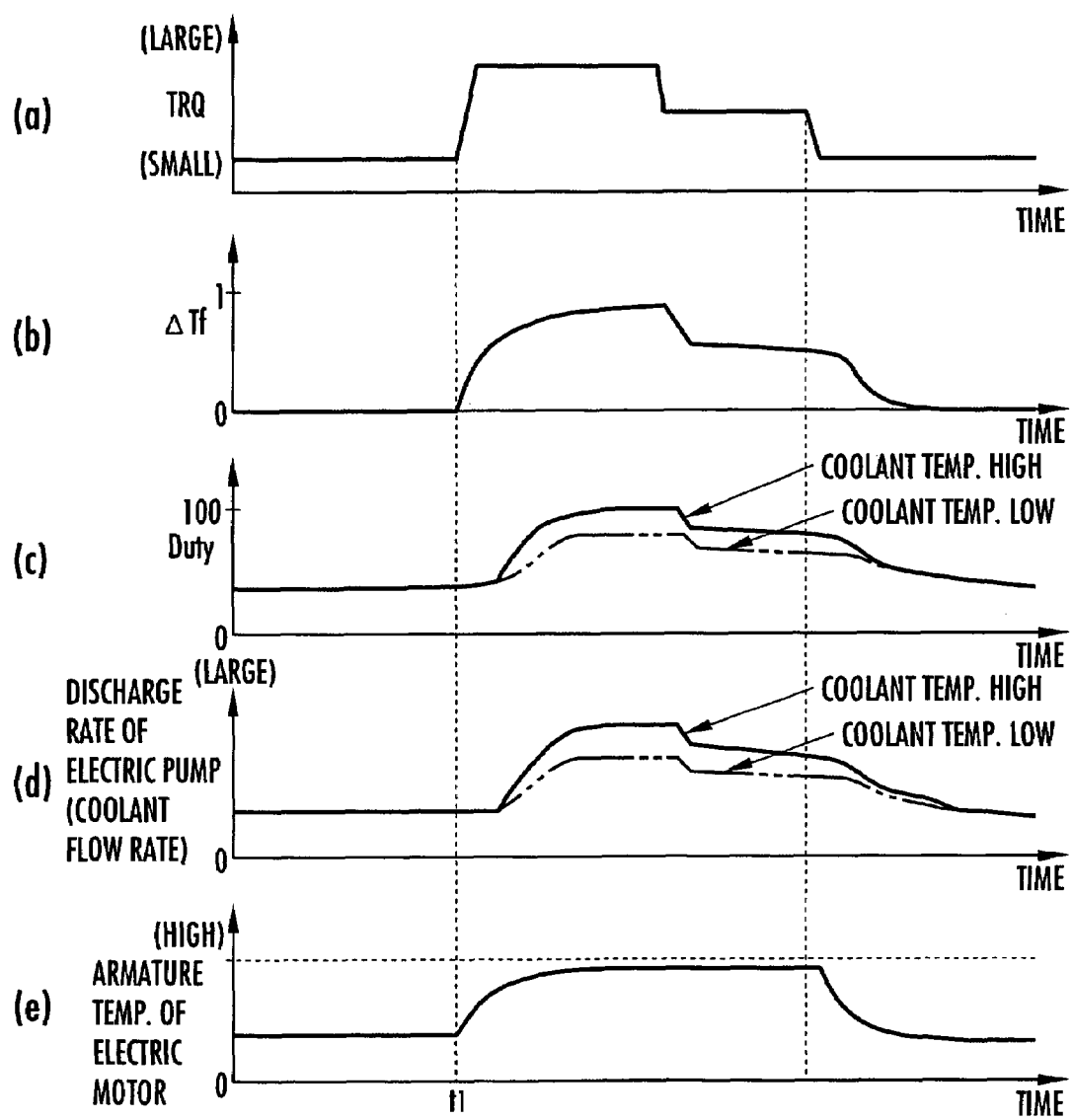
FIGS. 12A to 12E are graphs illustrating variations in torque command value TRQ for the electric motor, temperature transition estimate ΔTf of the electric motor, duty ratio Duty for an electric pump, discharge rate of the electric pump, and armature temperature of the electric motor, respectively, according to the first embodiment of the present invention.

FIGS. 12A to 12E illustrate the time-varying states of the parameters such as the temperature transition estimate ΔTf with respect to changes in the torque command value TRQ. FIGS. 12A to 12E show the time-varying states of the torque command value TRQ, the temperature transition estimate ΔTf, the duty ratio Duty, the discharge rate of the electric pump 8 (i.e., the coolant flow rate to be supplied to the electric motor 1), and the actual temperature (measured value) of the armature of the electric motor 1. Referring to FIG. 12, when the torque command value TRQ is adjusted to change up and down after time t1 until which it is maintained constant as shown in FIG. 12A (i.e., when it is adjusted to change up and down in a torque range above the rated torque), the temperature transition estimate ΔTf changes up and down as shown in FIG. 12B. Basically, the temperature transition estimate ΔTf gradually increases as the magnitude of the torque command value TRQ increases, while it gradually decreases as the magnitude of the torque command value TRQ decreases.

In this situation, if the coolant temperature Tc is relatively high, the duty ratio Duty and the discharge rate of the electric pump 8 (substantially proportional to Duty) change up and down as indicated by solid lines in FIGS. 12C and 12D, respectively. On the other hand, if the coolant temperature Tc is relatively low, the duty ratio Duty and the discharge rate of the electric pump 8 change up and down as indicated by two-dot chain lines in FIGS. 12C and 12D. Basically, the duty ratio Duty and the discharge rate of the electric pump 8 increase as the temperature transition estimate ΔTf increases, while they decrease as the temperature transition estimate ΔTf decreases. While the magnitude of the torque command value TRQ is changing (increasing or decreasing), the changes in the duty ratio Duty and the discharge rate of the electric pump 8 become smaller when the coolant temperature Tc is low than when it is high.

Since the discharge rate (coolant flow rate) of the electric pump 8 is controlled as mentioned above, the temperature of the armature of the electric motor 1 changes as shown in FIG. 12E. In this case, the increasing degree of the armature temperature is repressed against the increasing tendency of the temperature transition estimate $\Delta Tf$ so that the armature temperature will be maintained in a range of temperatures lower than an upper limit temperature (indicated by a lateral dashed line in FIG. 12E) at which the electric motor 1 starts overheating.

According to the above-described first embodiment, the temperature transition estimate $\Delta Tf$ representing a pattern of inferred values of temperature changes of the electric motor 1 (in the armature of the electric motor 1) caused by the passage of electric current therethrough to determine a duty ratio Duty for controlling the discharge rate of the electric pump 8 according to the temperature transition estimate $\Delta Tf$ and the detected value of the coolant temperature Tc. Therefore, heat can be absorbed from the electric motor 1 at a proper coolant flow rate without excessively increasing the flow rate of coolant supplied from the electric pump 8 to the electric motor 1, thereby preventing the electric motor 1 from overheating. As a result, the electric motor 1 can be prevented from overheating without unnecessarily excessive power consumption. Further, since the electric motor 1 can be prevented from overheating, such an event that the output torque of the electric motor 1 should be limited can also be avoided. This can ensure running performance required for the vehicle.

In the embodiment, since the temperature transition estimate $\Delta Tf$ is determined through the fuzzy inference operation performed by the first fuzzy inference means 24, the temperature sensor for detecting the temperature of the electric motor 1 can be omitted from the apparatus, so that not only can the product cost be reduced, but the maintainability of the electric motor 1 can be improved. The number of parameters necessary to be preset for determining the temperature transition estimate $\Delta Tf$ can also be reduced compared to a case using a heat transfer model, which results in simplifying a program for calculating the temperature transition estimate $\Delta Tf$ and reducing the memory capacity for storing the program and the parameter values. In addition, since the coolant flow adjusting value $\Delta Q$ is also determined through the fuzzy inference operation performed by the second fuzzy inference means 26, the necessary memory capacity is further reduced compared to a case where the coolant flow adjusting value $\Delta Q$ or the desired value of the coolant flow rate is determined using a map or the like.

Accordingly, the electric motor 1 can be prevented from overheating without the need for a complicated algorithm and a high-capacity memory.

A second embodiment of the present invention will next be described with reference to FIGS. 13 to 15. The second embodiment differs from the first embodiment only in part of the processing operation of the motor ECU. The processing step in the second embodiment common to that in the first embodiment is given the same reference number, and the description of the same structural elements and processing steps as in the first embodiment is omitted.

According to the second embodiment, only the processing step corresponding to STEP 8 in the flowchart of FIG. 11 is different from that in the first embodiment. FIG. 13 shows a sequence of subroutines for STEP 8 according to this embodiment.

Figure 13:
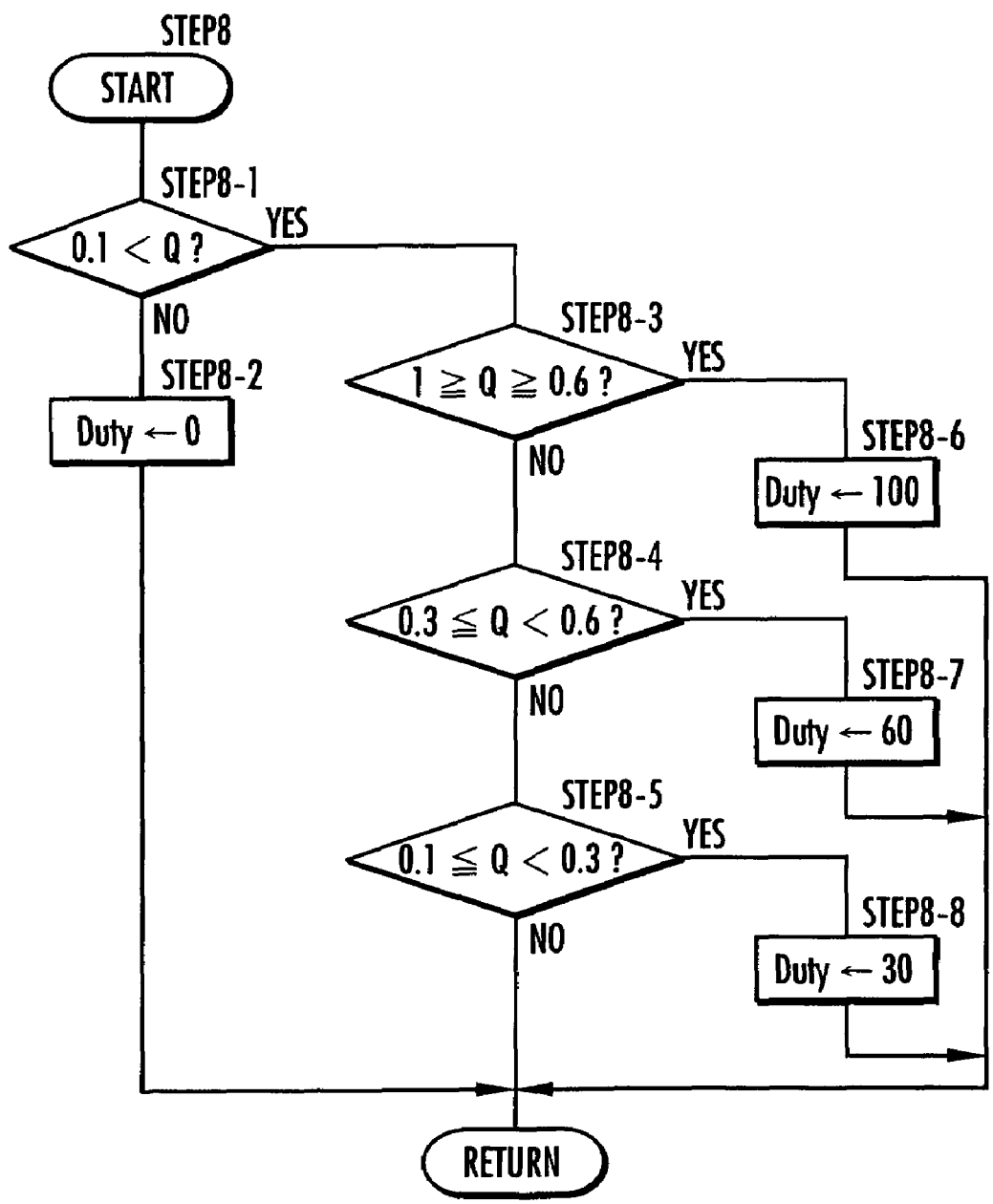
FIG. 13 is a flowchart of the main part of control processing by the motor ECU according to a second embodiment of the present invention.
Figure 14:
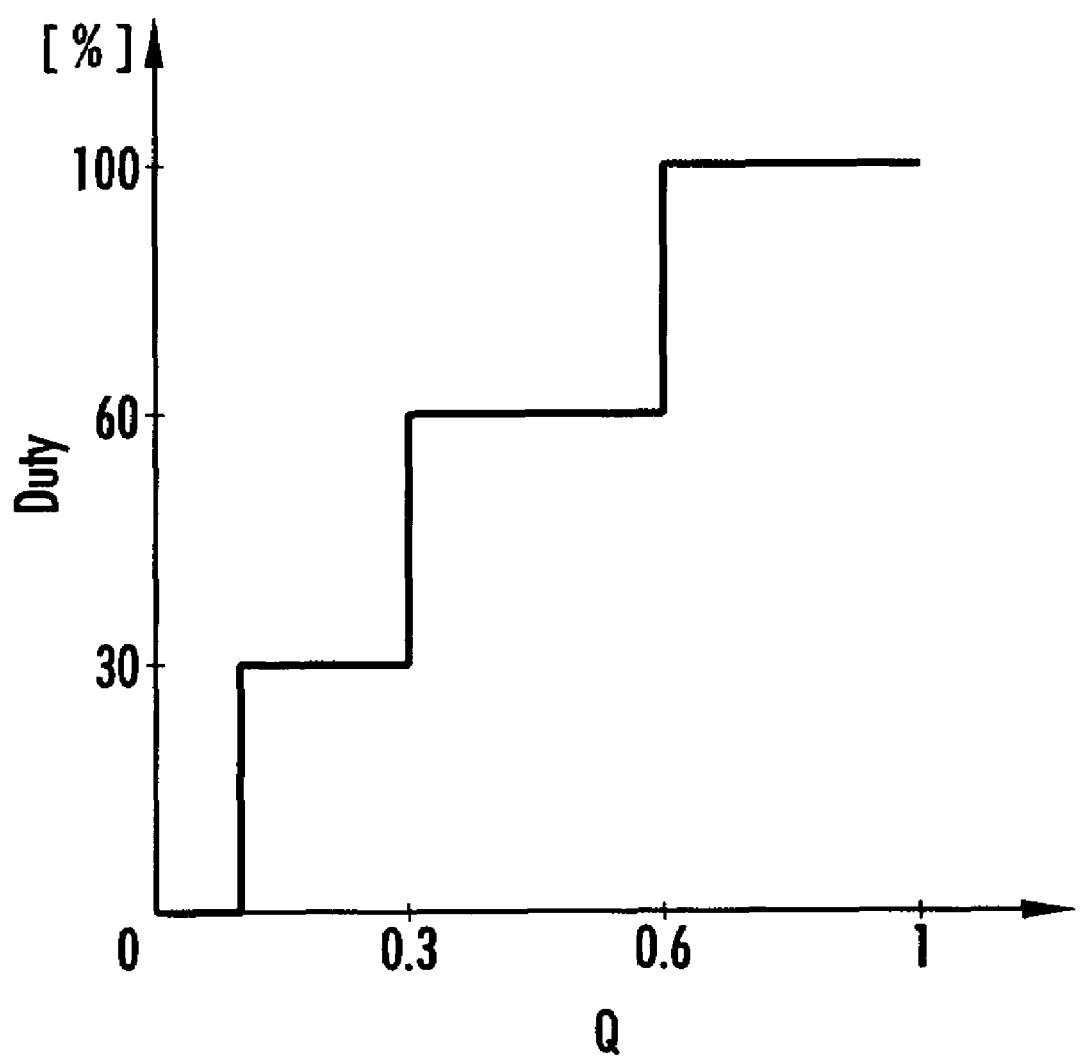
FIG. 14 is a graph showing the relationship between desired value Q for the discharge rate of the electric pump and duty ratio Duty according to the second embodiment of the present invention.

Referring to FIG. 13, the duty determining means 28 determines in STEP8-1 whether the desired value Q for the discharge rate of the electric pump 8 determined in STEP 7 in the manner mentioned above is larger than 0.1. If the determination result is NO, duty ratio Duty is set to "0" in STEP8-2. If the determination result in STEP8-1 is YES, the duty determining means 28 determines whether the desired value Q for the discharge rate falls in the ranges of $1 \geq Q \geq 0.6$, $0.3 \leq Q < 0.6$, and $0.1 < Q \leq 0.3$, respectively, in STEP8-3, STEP8-4, and STEP8-5. If the determination result in STEP8-3 is YES, duty ratio Duty is set to 100 (percent) in STEP8-6. If the determination result in STEP8-4 is YES, duty ratio Duty is set to 60 (percent) in STEP8-7. If the determination result in STEP8-5 is YES, Duty is set to 30 (percent) in STEP8-8. An additional explanation is that the determination result in STEP8-5 can never be NO because the desired value Q for the discharge rate of the electric pump 8 is the same relative value in the range of "0" to "1" as in the first embodiment. Therefore, the determination in STEP8-5 may be omitted by executing STEP8-8 when the determination result in STEP8-4 is NO.

In the embodiment, duty ratio Duty is set to 0, 30, 60, or 100 (percent) in a stepwise manner according to the desired value Q for the discharge rate. In other words, duty ratio Duty is represented by a characteristic curve in a graph of FIG. 14 with respect to the desired value Q for the discharge rate. In the embodiment, although duty ratio Duty is determined through the sequence of subroutines STEP8-1 to STEP8-8, the graph of FIG. 14 may be stored as a data table so that Duty will be determined from the desired value Q based on the data table.

The other structural elements and processing steps in the second embodiment is the same as those in the first embodiment.

FIGS. 15A to 15D illustrate the time-varying states of the parameters such as the temperature transition estimate $\Delta Tf$ with respect to changes in the torque command value TRQ. FIGS. 15A to 15D show the time-varying states of the torque command value TRQ, the temperature transition estimate $\Delta Tf$, the duty ratio Duty, and the discharge rate of the electric pump 8 (i.e., the coolant flow rate), respectively. FIGS. 15A and 15B are the same as FIGS. 12A and 12B in the first embodiment.

Figure 15:
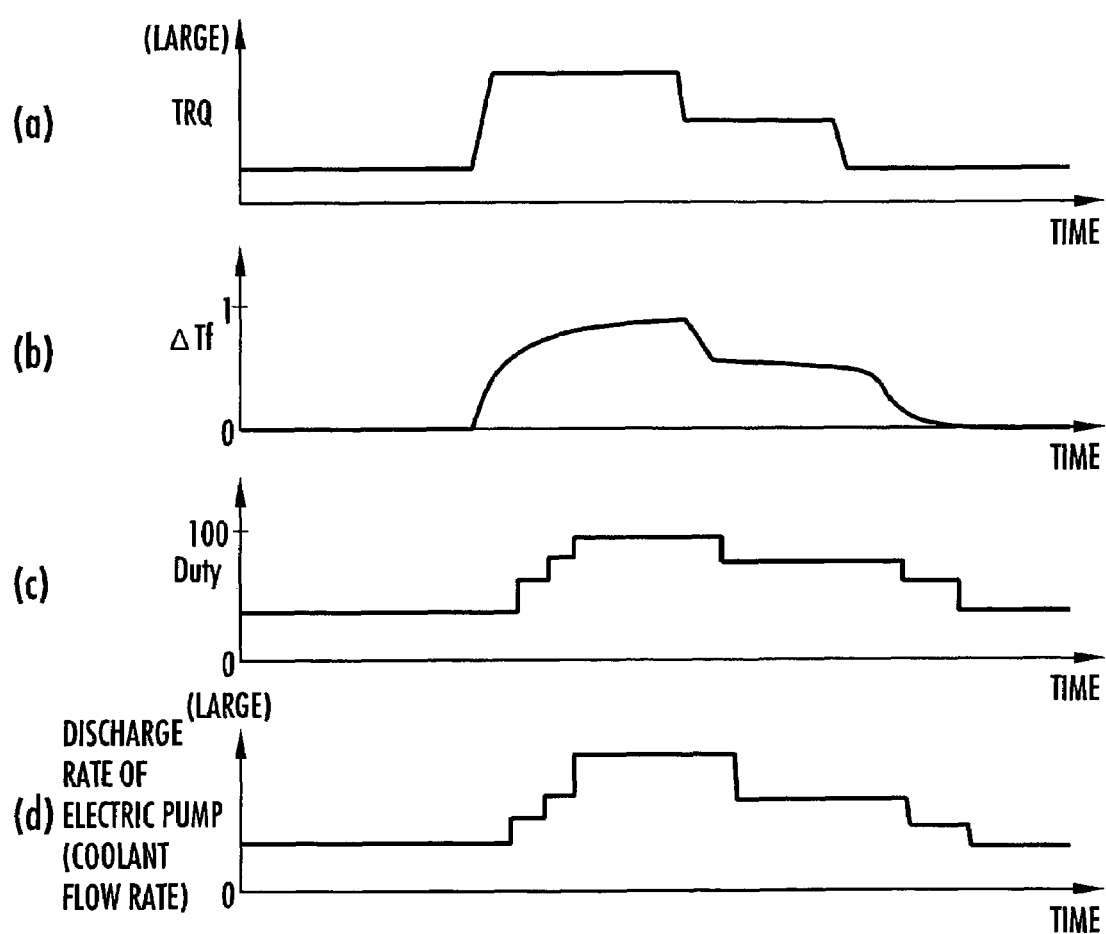
FIGS. 15A to 15D are graphs illustrating variations in torque command value TRQA for the electric motor, temperature transition estimate ΔTf of the electric motor, duty ratio Duty for an electric pump, and discharge rate of the electric pump, respectively, according to the second embodiment of the present invention.

In the embodiment, when the torque command value TRQ is adjusted to change as shown in FIG. 15A, the duty ratio Duty and the discharge rate of the electric pump 8 change in a stepwise manner as shown in FIGS. 15C and 15D, respectively. Even when they change in such a stepwise manner, the actual temperature of the armature of the electric motor 1, not shown in FIG. 15, change substantially in the same manner as in FIG. 12E, which can also prevent the electric motor 1 from overheating.

Thus, the second embodiment has the same advantage as the first embodiment.

In the aforementioned first and second embodiments, the coolant flow rate is adjusted by changing the duty ratio Duty of the pulse voltage to be applied to the electric pump 8. Alternatively, for example, an electromagnetic flow valve may be provided in the coolant circulating path 7 to pass the coolant through the valve, and controlled to adjust the coolant flow rate. Further, in the aforementioned embodiments, the coolant temperature sensor 10 is provided outside of the electric motor 1, but it may be attached to the electric motor 1.

In the aforementioned embodiments, the coolant temperature sensor 10 is provided in the coolant circulating path 7, but a temperature sensor may be attached to the electric motor 1 to use the detected temperature from the temperature sensor as a substitute for the detected value of the coolant temperature.

Further, in the aforementioned embodiments, the torque command value TRQ is corrected and the corrected torque command value P_TRQ proportional to the actual armature current of the electric motor 1 is used for magnetic field weakening control of the electric motor 1, but the torque command value TRQ may be used as it is, instead of the corrected torque command value P_TRQ, so that the target torque command value TRQ and an average value of torque command values TRQ obtained through the low-pass filter 23 will be input into the first fuzzy inference means 24.

Furthermore, in the aforementioned embodiments, the motor ECU 15 includes the torque command value correcting means 22, the low-pass filter 23, the first fuzzy inference means 24, the first integration means 25, the second fuzzy inference means 26, the second integration means 27, and the duty determining means 28, but they may be provided in the pump ECU 16 because they are not directly involved in controlling the operation of the electric motor 1. In this case, the torque command value TRQ is given from the motor ECU 15 to the pump ECU 16.

What is claimed is:

1. An overheat preventing apparatus for preventing an electric motor for a vehicle from overheating, comprising:
   temperature transition estimating means for estimating a temperature transition of the electric motor caused by the passage of electric current through the electric motor;
   coolant supplying means for supplying a coolant to the electric motor; and
   coolant supply control means for controlling the amount of coolant supply from said coolant supplying means according to at least the estimated temperature transition of the electric motor,
   wherein the electric motor is controlled according to command values for torque to be produced by the electric motor;
   motor control means for performing d-q vector control of the electric motor according to the torque command values; and
   torque command correcting means for correcting the torque command values according to at least the rotational speed of the electric motor,
   wherein said temperature transition estimating means estimates the temperature transition of the electric motor using the corrected torque command values and an average value of the corrected torque command values.

2. The apparatus according to claim 1 further comprising coolant temperature sensing means for sensing the temperature of the coolant to be supplied to the electric motor,
   wherein said coolant supply control means controls the amount of coolant supply from said coolant supplying means according to the sensed coolant temperature and the estimated temperature transition of the electric motor.

3. The apparatus according to claim 2, wherein said coolant supply control means uses the estimated temperature transition of the electric motor and the sensed coolant temperature as input parameters to determine, by fuzzy inference, an amount of operation of the coolant supplying means from the input parameters, operate the coolant supplying means according to the determined amount of operation, and control the amount of coolant supply to the electric motor.

4. The apparatus according to claim 3 wherein said coolant supply control means includes means for calculating goodness-of-fit values for fuzzy rules based on membership functions from the membership functions for classifying and expressing the respective orders of magnitude of the input parameters, a plurality of fuzzy rules having the respective orders of magnitude of the input parameters in the antecedent part and a plurality of preset values for the amount of operation of said coolant supplying means in the consequent part, and the input parameters, and means for calculating a weighted average value of the plurality of set values in the consequent part of the fuzzy rules using the calculated goodness-of-fit values as weighting factors in the consequent part of the fuzzy rules to determine the calculated average value as the amount of operation.

5. The apparatus according to claim 3 wherein the amount of operation defines a corrective value for the amount of coolant supply from said coolant supplying means, and said coolant supplying means includes means for integrating a series of determined values for the amount of operation to determine the integral as a value to define the amount of coolant supply from said coolant supplying means, and means for controlling the amount of coolant supply according to the calculated integral.

6. The apparatus according to claim 1 wherein the temperature transition of the electric motor estimated by said temperature transition estimating means is a temperature transition of the electric motor in a region of temperature equal to or above a temperature of the electric motor in a steady-state in which the torque of the electric motor is maintained in a predetermined torque range.

7. The apparatus according to claim 1, wherein said temperature transition estimating means includes temperature change estimating means for estimating temperature changes of the electric motor per predetermined unit time by fuzzy inference from the torque command values and the average value of the torque command values as input parameters, and integration means for calculating an integral of the estimated temperature changes as an estimate of the temperature transition of the electric motor.

8. The apparatus according to claim 7, wherein said temperature transition estimating means includes means for calculating goodness-of-fit values for fuzzy rules based on membership functions from the membership functions for classifying and expressing the respective orders of magnitude of the input parameters, a plurality of fuzzy rules having the respective orders of magnitude of the input parameters in the antecedent part and a plurality of preset values for the temperature changes per unit time in the consequent part, and the input parameters, and means for calculating a weighted average value of the plurality of set values in the consequent part of the fuzzy rules using the calculated goodness-of-fit values as weighting factors in the consequent part of the fuzzy rules to determine the calculated average value as an estimate of the temperature changes per unit time.

9. The apparatus according to claim 7, further comprising motor control means for performing d-q vector control of the electric motor according to the torque command values, and torque command correcting means for correcting the torque command values according to at least the rotational speed of the electric motor, wherein said temperature change estimating means estimates the temperature transition of the electric motor using the corrected torque command values and an average value of the corrected torque command values, instead of the torque command values and the average value of the torque command values.

10. The apparatus according to claim 9, wherein said torque command correcting means corrects the torque command values according to the rotational speed of the electric motor and the power-supply voltage of the electric motor.

11. The apparatus according to claim 1, wherein said torque command correcting means corrects the torque command values according to the rotational speed of the electric motor and the power-supply voltage of the electric motor.

* * * * *